(12) United States Patent
Myles et al.

(10) Patent No.: US 8,589,897 B2
(45) Date of Patent: **\*Nov. 19, 2013**

(54) SYSTEM AND METHOD FOR BRANCH EXTRACTION OBFUSCATION

(75) Inventors: Gideon M. Myles, San Jose, CA (US); Julien Lerouge, Santa Clara, CA (US); Tanya Michelle Lattner, San Jose, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1459 days.

This patent is subject to a terminal disclaimer.

(21) Appl. No.: 12/198,873

(22) Filed: Aug. 26, 2008

(65) Prior Publication Data

US 2010/0058301 A1    Mar. 4, 2010

(51) Int. Cl.
*G06F 9/45* (2006.01)

(52) U.S. Cl.
USPC .......................................... 717/142; 717/159

(58) Field of Classification Search
None
See application file for complete search history.

(56) References Cited

U.S. PATENT DOCUMENTS

| | | | | |
|---|---|---|---|---|
| 5,343,554 | A * | 8/1994 | Koza et al. | 706/13 |
| 2004/0154004 | A1 * | 8/2004 | Maine | 717/136 |
| 2007/0016845 | A1 * | 1/2007 | Yankovich | 715/500 |
| 2007/0256061 | A1 * | 11/2007 | Victorov | 717/141 |
| 2008/0288902 | A1 * | 11/2008 | Nishide et al. | 716/5 |
| 2010/0199354 | A1 | 8/2010 | Eker et al. | |

FOREIGN PATENT DOCUMENTS

WO    WO2008074382 A1 *   6/2008

OTHER PUBLICATIONS

Toshio Ogiso, Yusuke Sakabe, Masakazu Soshi, Atsuko Miyaji. "Software Tamper Resistance Based on the Difficulty of Interprocedural Analysis", Aug. 2002.*

T. Ogiso, Y. Sakabe, M. Soshi and A. Miyaji, Software Tamper Resistance Based on the Difficulty of Interprocedural Analysis, Proceedings of the 3rd Workshop on Information Security Applications (WISA 2002), Korea, Aug. 2002.

(Continued)

*Primary Examiner* — Henry Tsai
*Assistant Examiner* — John Roche
(74) *Attorney, Agent, or Firm* — Novak Druce Connolly Bove + Quigg LLP

(57) ABSTRACT

Disclosed herein are systems, methods, and computer readable-media for obfuscating code. The method includes extracting a conditional statement from a computer program, creating a function equivalent to the conditional statement, creating a pointer that points to the function, storing the pointer in an array of pointers, replacing the conditional statement with a call to the function using the pointer at an index in the array, and during runtime of the computer program, dynamically calculating the index corresponding to the pointer in the array. In one aspect, a subset of instructions is extracted from a path associated with the conditional statement and the subset of instructions is placed in the function to evaluate the conditional statement. In another aspect, the conditional statement is replaced with a call to a select function that (1) calculates the index into the array, (2) retrieves the function pointer from the array using the index, and (3) calls the function using the function pointer. Calls can be routed through a select function before the function pointer is used to call the function evaluating the conditional statement. Each step in the method can be applied to source code of the computer program, an intermediate representation of the computer program, and assembly code of the computer program.

14 Claims, 7 Drawing Sheets

(56) References Cited

OTHER PUBLICATIONS

Cullen Linn and Saumya Debray, "Obfuscation of Executable Code to Improve Resistance to Static Disassembly," Proceedings of 10th ACM Conference on Computer and Communications Security (CCS 2003), Oct. 2003.

Majumdar, Anirban et al., "A Survey of Control-Flow Obfuscation", Proceedings of the International Conference on Information Systems Security, Lecture Notes in Computer Science, vol. 4332, 2006, Springer-Verlag Berlin Heidelberg, Dec. 19, 2006, 353-356.

Myles, Ginger et al., "Software Watermarking via Opaque Predicates: Implementation, Analysis, and Attacks", Electronic Commerce Research, vol. 6, Issue 2, 2006, Springer Science and Business Media, 2006, 155-171.

* cited by examiner

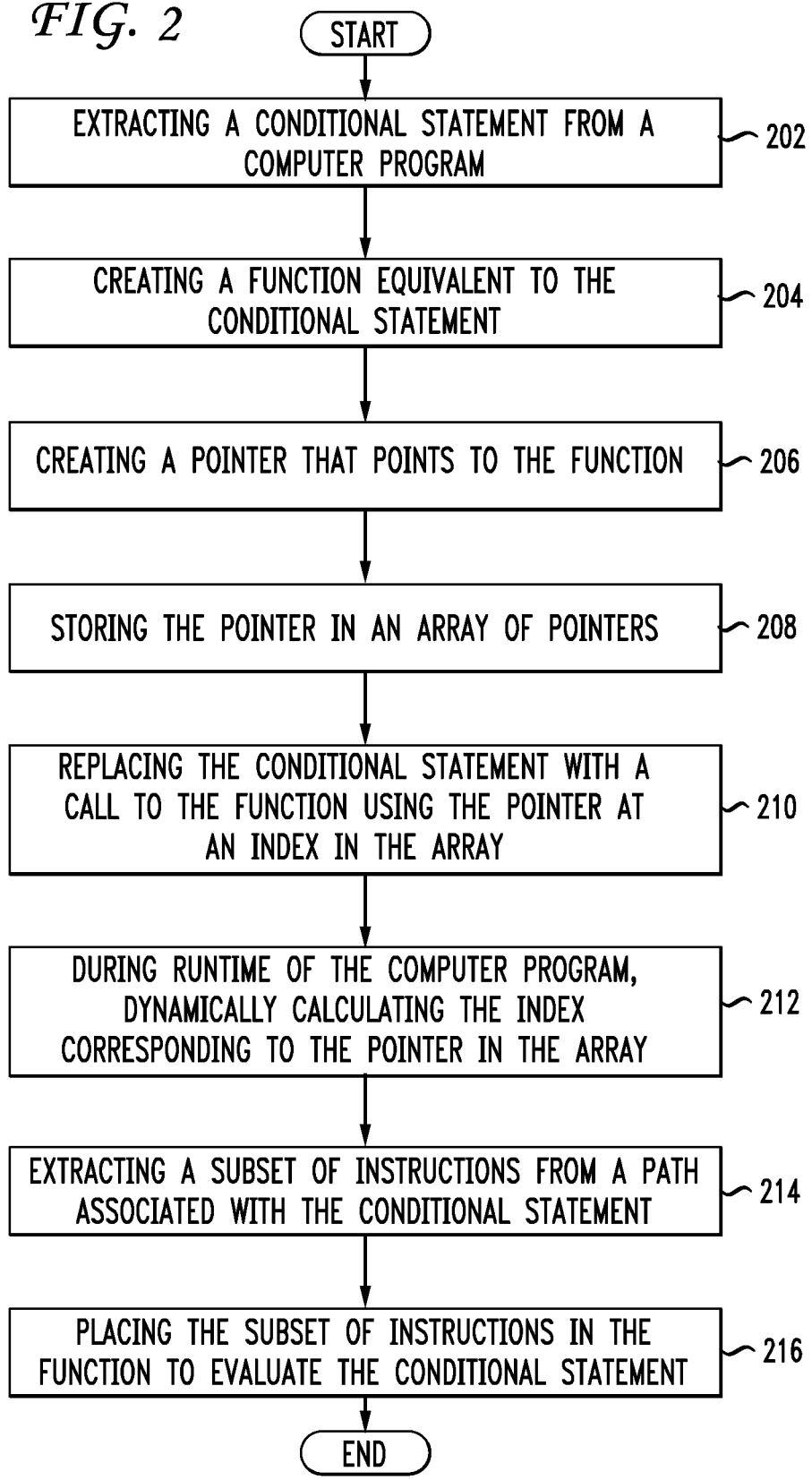

FIG. 3A

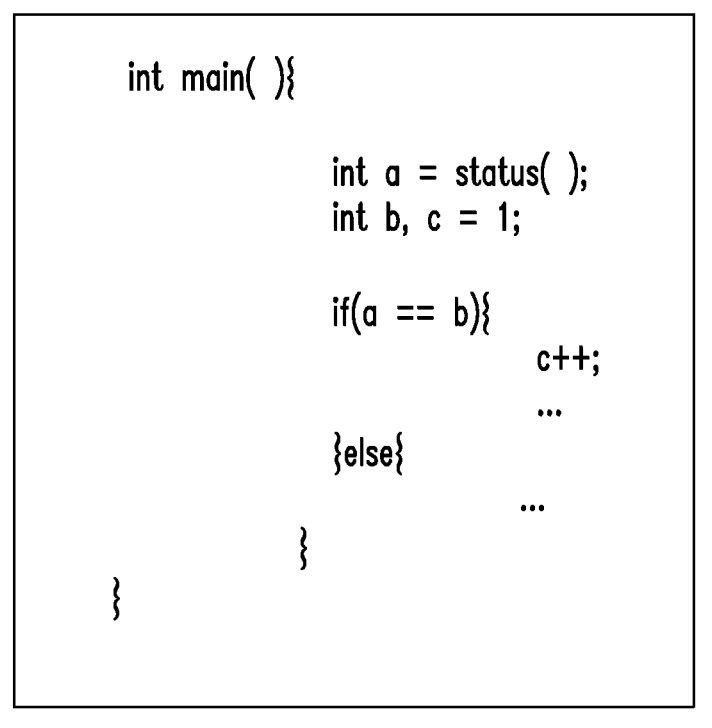

```
int main( ){ int a = status( );
        int b, c = 1;

if(a == b){
                    c++;
                    ...
        }else{
                    ...
        }
}
```

FIG. 3B

```
int main( ){ int a = status();
        int b, c = 1;

if(cf(a, b, &c)){
                ...
        }else{
                ...
        }

} bool cf(int a, int b, int *c){ if(a == b){
                c++;
                return 1;
        }else
                return 0;

```
int main( ){
        int a = status1( );
        int b, c = 1;

if(a == 1){
                b++;
                ...
        }
        while(a < b){
                a++;
                ...
        }
}
```

FIG. 4B

```
    bool (*fp)( ... );
    bool (*A[2])( ... ) = {&cf1, &cf2};

int main( ){
            int a = status1( );
            int b = status2( );
            int c = 1;

int i = calculateIndex( );
            fp = A[i];
            if((*fp)(a, &b)){
                        ...
            } i = calculateIndex( );
            fp = A[i];
            while((*fp)(&a, b)){
                        ...
            }
}
bool cf1(int a, int *b){
            if(a == 1){
                        b++;
                        return 1;
            }else
                        return 0;
}
bool cf2(int *a, int b){
            if(a < b){
                        a++;
                        return 1;
            }else
                        return 0;
}
```

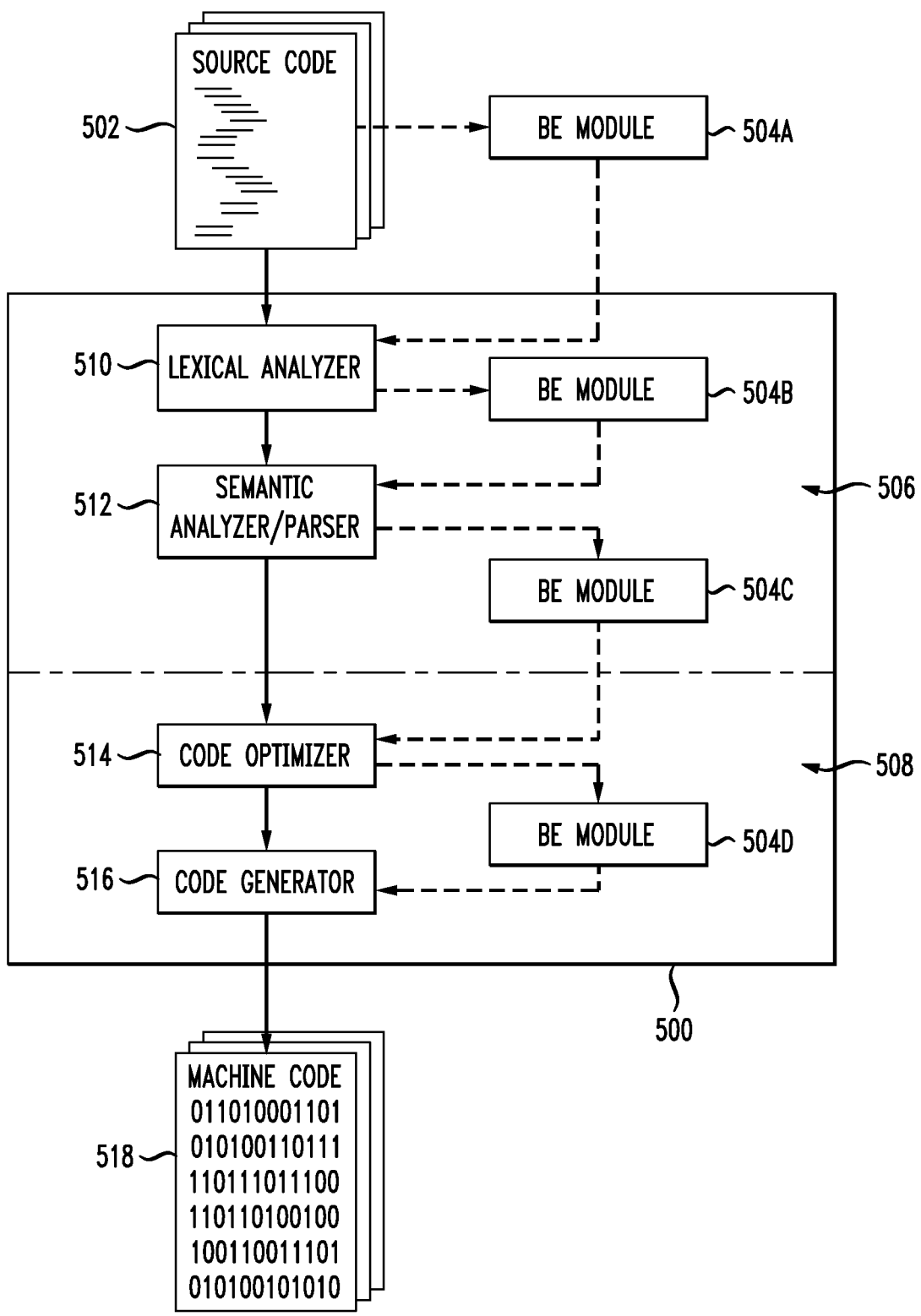

SYSTEM AND METHOD FOR BRANCH EXTRACTION OBFUSCATION

CROSS-REFERENCE TO RELATED APPLICATIONS

This application relates to U.S. Patent Application No. 12/203,101, titled "System and Method for Modulus Obfuscation", U.S. Patent Application No. 12/202,909, titled "System and Method for Conditional Branch Obfuscation", and U.S. Patent Application No. 12/135,032, titled "System and Method for Array Obfuscation".

BACKGROUND OF THE INVENTION

1. Field of the Invention

The present invention relates to software obfuscation and more specifically to obfuscating conditional segments of software.

2. Introduction

Computer software is first written as source code which is readable by a person trained to understand programming languages. Generally that source code is then compiled to object code that contains a list of instructions controlling what a computer does. Unfortunately for commercial software vendors who wish to enforce licensing or Digital Rights Management (DRM) provisions, malicious or mischievous individuals with enough time and resources can reverse engineer critical portions of the object code. Reverse engineering allows for discovery of how a program operates. One technique to reverse engineer object code is to load the executable into memory and examine the memory contents with a piece of software called a debugger to locate the critical portions of software enforcing the restrictions. Once the appropriate portions of object code are located and reverse engineered, the software may be modified to perform in a manner not anticipated by the software vendor, potentially bypassing DRM or licensing restrictions, but also potentially causing great harm or injury. For example, a malicious reverse engineer could alter legitimate code to include a virus or could alter operating software for dangerous machinery to disregard safety protocols.

DRM and software protection schemes in general work by means of security through obscurity, security by design, encryption, and other methods. Even a blend of these approaches is often insufficient to keep out a determined "hacker" or "cracker". While it is impossible to design a software protection scheme that is invulnerable to reverse engineering, the goal is not to create an impenetrable barrier. The goal is to raise the cost of reverse engineering so high that the perceived cost of reverse engineering outweighs the expected benefit. Accordingly, what is needed in the art is an improved way to store and execute compiled software in a computing device while making the software difficult to reverse engineer.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for obfuscating code. The method includes extracting a conditional statement from a computer program, creating a function equivalent to the conditional statement, creating a pointer that points to the function, storing the pointer in an array of pointers, replacing the conditional statement with a call to the function using the pointer at an index in the array, and during runtime of the computer program, dynamically calculating the index corresponding to the pointer in the array. In one aspect, a subset of instructions is extracted from a path associated with the conditional statement and the subset of instructions is placed in the function to evaluate the conditional statement. In another aspect, the conditional statement is replaced with a call to a select function that (1) calculates the index into the array, (2) retrieves the function pointer from the array using the index, and (3) calls the function using the function pointer. Calls can be routed through a select function before the function pointer is used to call the function evaluating the conditional statement. Each step in the method can be applied to source code of the computer program, an intermediate representation of the computer program, and assembly code of the computer program.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates an example method embodiment;

FIG. 3A illustrates an unmodified sample program 1;

FIG. 3B illustrates a transformed sample program 1 after extracting the conditional expression;

FIG. 4A illustrates an unmodified sample program 2;

FIG. 4B illustrates a transformed sample program 2 after extracting the two conditional expressions; and FIG. 5 illustrates a block diagram of a compiler which includes a branch extraction module.

DETAILED DESCRIPTION

Figure 1:
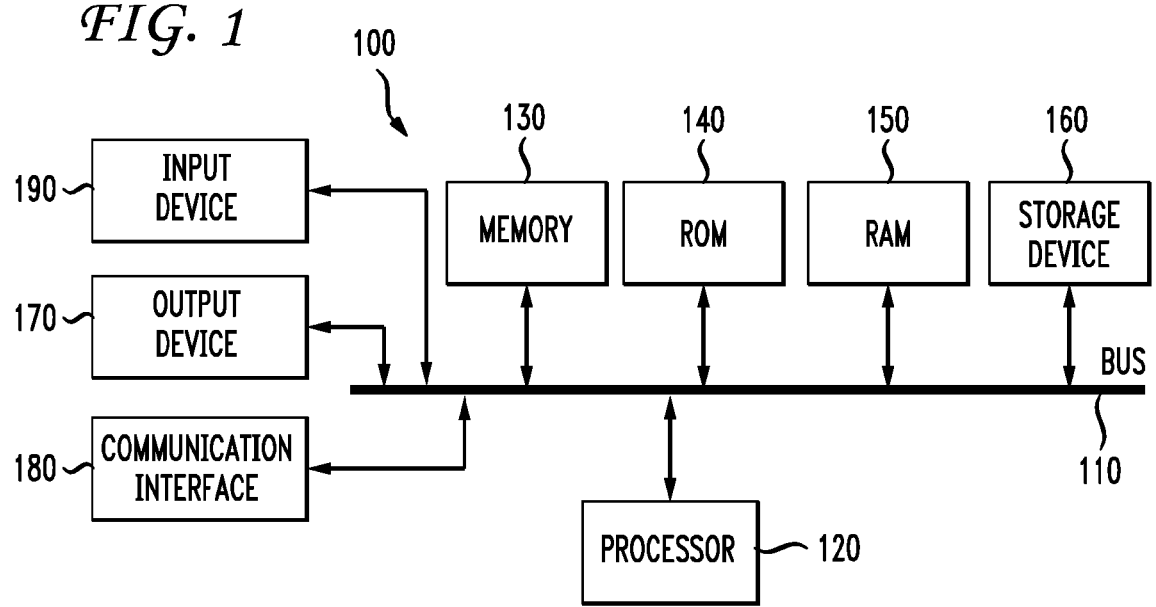
FIG. 1 illustrates an example system embodiment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Obfuscation in the software realm is a process of making software or data confusing and difficult to understand, reverse engineer, disassemble, and/or decompile while maintaining the original, intended functionality. Obfuscation can be performed at a source code level to make understanding the source difficult or it can be performed at an object code or machine language level to make reverse engineering difficult. Both could be used in conjunction, but using one or the other is typically sufficient. At the object code or machine language level, obfuscation is often desirable to improve the resistance of compiled software, or binary, to static analysis. The general idea behind any obfuscation technique is to increase the amount of time, effort, and/or resources required to reverse engineer the binary that it is less costly to simply purchase or license the software or, alternatively, recreate it from scratch without using information from the protected program. Additionally, strong obfuscation techniques will force reverse engineering attempts away from static analysis and towards dynamic analysis, which is more difficult. Often source code is kept a secret from the public in a non-obfuscated form while publicly available binaries are distributed in obfuscated form. One goal of such a parallel obfuscated/non-obfuscated software distribution scheme is to achieve the advantages of obfuscation and keep the software maintainable.

Keeping these fundamental principles in mind, the disclosure turns to an exemplary method embodiment as illustrated in FIG. 2. The method is described in terms of a system that performs the steps of the method. However, the method can be performed manually by a programmer or can be performed by means of an automated system and/or software. The system extracts a conditional statement from a computer program (202). IF . . . THEN is the classic conditional statement. IF . . . THEN . . . ELSE and IF . . . THEN . . . ELSE IF are common variations. Conditional statements also include SWITCH statements which are effectively a series of individual IF . . . THEN statements. C-style FOR loops contain conditionals as a component as well as almost any other loops, such as DO . . . WHILE, WHILE, REPEAT . . . UNTIL, etc. Conditional statements can be nested within other conditional statements. Any of these conditional statements may be extracted as well as others yet to be developed. The syntax of the conditional statement in a given language does not affect the applicability of the branch extraction obfuscation technique; branch extraction obfuscation can be accomplished with virtually any programming language.

The system creates a function equivalent to the conditional statement (204) and creates a pointer that points to the function (206). The pointer can be a function pointer. Throughout this disclosure, when function pointer is used, a regular pointer can serve as a substitute. The system stores the pointer in an array of pointers (208). The system replaces the conditional statement with a call to the function using the pointer at an index in the array (210), thereby obfuscating the original conditional statement. To retrieve and use the obfuscated code, the system dynamically calculates the index corresponding to the pointer in the array during runtime of the computer program (212). A special function within the obfuscated program can calculate indexes during program initialization, right before the replaced conditional statement is evaluated, or at any other time prior to encountering the replaced conditional statement. The system can dynamically calculate the index in a companion program on the same computing device or at a remote computing device. Thereby, the system calculates the index during runtime and retrieves a function pointer from the array which corresponds to a function that evaluates the same way as the conditional statement it replaced. In one embodiment, the system replaces the conditional statement with a call to a select function that calculates the index into the array, retrieves the function pointer from the array using the index, and calls the function using the function pointer.

Because a conditional is being replaced by a function call, certain conditional functions can partially or entirely incorporate associated instructions during evaluation of the conditional function. Thus, the following two optional steps can be appended to the method. These two steps should be performed together, if at all. The system can optionally extract a subset of instructions from a path associated with the conditional statement (214) and place the subset of instructions in the function to evaluate the conditional statement (216). As an example, consider the following pseudocode IF (W<10) THEN {X+=1; Y+=2; Z-=3}. When the conditional statement (W<10) is replaced with a function call, the function can include X+=1 and Z-=3. This technique places further distance between the instructions and can even rearrange them if the code allows. The resulting obfuscated, fragmented, rearranged code is very cumbersome to reverse engineer and may even be impossible for conventional automated reverse engineering methods. Further, the system can route calls through a select function before the function pointer is used to call the function evaluating the conditional statement.

Each step described in the method can be applied to source code of a computer program, an intermediate representation of a computer program, and/or assembly/object code of a computer program. The method can be implemented by an automated system or software, such as a compiler, or can be implemented manually by a programmer. Branch extraction obfuscation can be applied additively to each stage in succession to further obfuscate the source code. Nested levels of obfuscation are possible. A user can establish a threshold of complexity to control the desired level of complexity, execution speed, and obfuscation. A programmer can mark certain portions of code with a special tag or a comment instructing the compiler to obfuscate the marked portions. Branch extraction obfuscation can be mixed and added with other types of obfuscation at various stages. FIGS. 3A, 3B, 4A, and 4B demonstrate the application of the method to source code for illustrative purposes, but should not be considered limiting. Because these principles are more difficult to illustrate as applied to intermediate representations or assembly/machine code, the source code example is provided.

Branch extraction obfuscation relies on spatial separation to improve resistance to static analysis. The system extracts a conditional expression to create a new function whose purpose is to evaluate that expression. In order to preserve the program's semantics the system replaces the conditional expression with a call to the new function, the conditional function. In FIG. 3B, the conditional function is shown as BOOL CF( ). For each extracted conditional expression the system creates a new conditional function that is specific to that expression. The system stores the conditional functions in an array or hash table or other indexed storage and associates each with a particular index. Furthermore, to prevent an attacker from just replacing a call to a conditional function, the system extracts a subset of the instructions from any true and/or false paths associated with conditional expression. For example, when the system extracts and replaces the conditional expression "A==B" in FIG. 3A, the result is the transformed program in FIG. 3B.

This transformation makes reverse engineering a program more difficult because an attacker must follow the function call, but would not sufficiently slow down a determined attacker to be useful in protecting most commercial software. Function pointers can be incorporated in order to increase the strength of the obfuscation and to increase resistance to attackers by requiring attackers to perform costly interprocedural analysis and/or use dynamic analysis tools. The function pointers are incorporated into the obfuscation technique by using them to make the call to the conditional functions.

Just using a function pointer is not enough to accomplish the ultimate goal of completely separating the calling code's identity from the call site. To accomplish this goal, the correct function pointer can be dynamically selected at run time from an array of conditional function pointers. Furthermore, the index into the array can be calculated at run time so that an attacker is forced to use dynamic analysis to identify which function will be called at any particular call site. Using this algorithm, the conditional expression is replaced by an instruction sequence that calculates the index into the array, retrieves the correct function pointer from the array, and then calls the correct conditional function using the retrieved function pointer. For example, when the two conditionals are extracted in FIG. 4A, the result is the transformed program in FIG. 4B.

As an alternative implementation, instead of replacing each conditional expression with the above sequence of instructions, the system replaces each conditional with a call to a single select function. The select function then calculates the index into the array, retrieves the correct function pointer from the array, and calls the conditional function using the function pointer. One advantage of this approach is that it limits the size impact resulting from the transformation, which could be useful in some commercial applications. Additional obfuscating transformations and techniques can be applied to the conditional functions and/or other parts of the program to further increase the strength of the obfuscation.

FIG. 5 illustrates a block diagram of a compiler which includes a branch extraction module. A compiler converts human readable source code to object code which is understandable and typically executable by a computer. A compiler is likely to perform many or all of the following operations: lexical analysis, preprocessing, parsing, semantic analysis, code optimization, and code generation. Compilers are important in the world of computer science and software because they allow programmers to express their ideas and write software using high level languages.

The compiler 500 takes as input source code 502 for a computer program written in a programming language like Perl, C++, Java, etc. Although a compiler is depicted, the same principles can be applied to an interpreted language, although other obfuscation and/or security measures may be needed when working with an interpreted language. Prior to sending source code as input to a compiler, a branch extraction obfuscation module 504A can be applied to the source code 502. The branch extraction obfuscation module is an optional step, as depicted by a dashed line. After the branch extraction obfuscation module processes the source code, the resulting code looks similar the modified source code shown in FIGS. 3B and 4B.

Next, the system passes the code to the front end of the compiler 506 and on to the back end of the compiler 508. Often the division between a front end and a back end of a compiler is somewhat blurred. Traditionally the front end of a compiler includes a lexical analysis module 510 and a semantic analyzer or parser module 512. Other front end components include a preprocessing module and a semantic analysis module. The front end produces an intermediate representation of the code which is passed to the back end 508 of the compiler 500. The back end 508 of a compiler 500 includes modules like an optimizer 514 and a code generator 516. The system can insert or engage one or more branch extraction obfuscation modules at any of the indicated points within the compiler 504B, 504C, 504D. The compiler 500 can make a decision as to the quantity and locations of branch extraction obfuscation modules to apply, a user can instruct the compiler, or the quantity and locations can be selected at random. Finally, the code generator 516 in the back end of the compiler produces machine code 518 or object code. The output from several compiled projects can be fed into a linker to combine related object code into a single executable file.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, branch extraction obfuscation can be integrated as part of a compiler, can be used as a separate tool to obfuscate source code, or can be used in combination with a suite of other obfuscation techniques. Those skilled in the art will readily recognize various modifications and changes that may be made to the present invention without following the example embodiments and applications illustrated and described herein, and without departing from the true spirit and scope of the present invention.

We claim:

1. A method of obfuscating code, the method comprising: identifying a Boolean statement in a conditional statement in a computer program, wherein when executed the Boolean statement evaluates to a Boolean output value in response to one or more input values;
creating a function that when executed evaluates to the Boolean output value in response to the one or more input values;
extracting a subset of intructions from a path associated with the conditional statement;
removing the subset of instructions from the path and inserting the subset of instructions in the function; and
replacing the Boolean statement with a call to the function, the function called using a pointer obtained from an array of pointers, wherein an index in the array identifying the pointer is dynamically calculated during execution of the computer program.

2. The method of claim 1, wherein the Boolean statement is replaced with a call to a select function, the select function comprising:
calculating, during the execution of the program, the index into the array,
retrieving a function pointer from the array using the index, and
calling the function using the function pointer.

3. The method of claim 1, wherein each step is applicable to source code of the computer program, an intermediate representation of the computer program, and assembly code of the computer program.

4. The method of claim 1, wherein the pointer is a function pointer.

5. The method of claim 1, wherein the index is dynamically calculated during an initialization period in runtime or right before the call to the function using the pointer.

6. A system for obfuscating code, the system comprising:
a processor;
a module configured to control the processor to identify a Boolean statement in a conditional statement in a computer program, wherein when executed the Boolean statement evaluates to a Boolean output value in response to a one or more input values;
a module configured to control the processor to create a function that when executed evaluates to the Boolean output value in response to the one or more input values;
a module configured to control the processor to extract a subset of instructions from a path associated with the conditional statement;
a module configured to control the processor to remove the subset of instructions from the path and insert the subset of instructions in the function; and
a module configured to control the processor to replace the Boolean statement in the conditional statement with a call to the function, the function called using a pointer obtained from an array of pointers, wherein an index in the array identifying the pointer is dynamically calculated during execution of the computer program.

7. The system of claim 6, wherein the Boolean statement is replaced with a call to a select function, the select function comprising:
calculating, during the execution of the program, the index into the array,
retrieving a function pointer from the array using the index, and
calling the function using the function pointer.

8. The system of claim 6, wherein each step is applicable to source code of the computer program, an intermediate representation of the computer program, and assembly code of the computer program.

9. The system of claim 6, wherein the pointer is a function pointer.

10. The system of claim 6, wherein the index is dynamically calculated during an initialization period in runtime or right before the call to the function using the pointer.

11. A non-transitory computer-readable medium storing a computer program having instructions for obfuscating code, the instructions comprising:
identifying a Boolean statement in a conditional statement in a computer program, wherein when executed the Boolean statement evaluates to a Boolean output value in response to a one or more input values;
creating a function that when executed evaluates to the Boolean output value in response to the one or more input values;
extracting a subset of instructions from a path associated with the conditional statement;
removing the subset of instructions from the path and inserting the subset of instructions in the function; and
replacing the Boolean statement with a call to the function, the function called using a pointer obtained from an array of pointers, wherein an index in the array identifying the pointer is dynamically calculated during execution of the computer program.

12. The non-transitory computer-readable medium of claim 11, wherein the Boolean statement is replaced with a call to a select function, the select function comprising:
calculating, during the execution of the program, the index into the array,
retrieving a function pointer from the array using the index, and
calling the function using the function pointer.

13. The non-transitory computer-readable medium of claim 11, wherein each step is applicable to source code of the computer program, an intermediate representation of the computer program, and assembly code of the computer program.

14. The non-transitory computer-readable medium of claim 11, wherein the index is dynamically calculated during an initialization period in runtime or right before the call to the function using the pointer.

* * * * *